(12) United States Patent
Hussein et al.

(10) Patent No.: US 6,342,984 B1
(45) Date of Patent: Jan. 29, 2002

(54) DISK DRIVE INCLUDING DC TO DC VOLTAGE CONVERTER FOR INCREASING VOLTAGE TO ITS SPINDLE MOTOR AND VCM

(75) Inventors: Hakam D. Hussein; Eric G. Oettinger; Eugene F. Plutowski, all of Rochester, MN (US)

(73) Assignee: Western Digital Technologies, INC, Lake Forest, CA (US)

( * ) Notice: Subject to any disclaimer, the term of this patent is extended or adjusted under 35 U.S.C. 154(b) by 0 days.

(21) Appl. No.: 09/162,657

(22) Filed: Sep. 29, 1998

Related U.S. Application Data

(63) Continuation-in-part of application No. 09/108,597, filed on Jul. 1, 1998.

(51) Int. Cl.$^7$ .............................................. G11B 15/18
(52) U.S. Cl. .......................... 360/69; 360/75; 318/432; 318/433
(58) Field of Search ........................ 360/69, 75, 77.03, 360/78.04, 77.02; 318/432, 433, 234

(56) References Cited

U.S. PATENT DOCUMENTS

| | | | |
|---|---|---|---|
| 4,991,129 A | * 2/1991 | Swartz | .................... 364/707 |
| 5,208,518 A | 5/1993 | Grapenthin et al. | |
| 5,363,028 A | * 11/1994 | Mori | ........................ 318/599 |
| 5,675,230 A | * 10/1997 | Dunfield | ................... 318/772 |
| 5,834,913 A | * 11/1998 | Yoshida et al. | ............ 318/270 |
| 5,965,992 A | * 10/1999 | Goretzki et al. | ........... 318/254 |
| 6,016,234 A | * 1/2000 | Blank et al. | .................. 360/75 |
| 6,094,020 A | * 7/2000 | Goretzki et al. | ........... 318/109 |
| 6,181,502 B1 | * 1/2001 | Hussein et al. | ............... 360/69 |

\* cited by examiner

*Primary Examiner*—David Hudspeth
*Assistant Examiner*—Dan I. Davidson
(74) *Attorney, Agent, or Firm*—Milad G Shara

(57) ABSTRACT

A disk drive is connectable to a power supply having a fixed DC voltage. The disk drive includes a voice coil motor and a spindle motor. A DC to DC voltage converter converts the fixed DC voltage to an increased DC voltage greater than the fixed DC voltage. A voice coil motor driver has switching elements which are controllable to supply the increased DC voltage to the voice coil motor. A spindle motor driver has switching elements which are controllable to supply the increased DC voltage to the spindle motor. The increased VCM voltage allows faster access times and more efficient VCM operation. The increased spindle motor voltage allows for more efficient spindle motor operation.

2 Claims, 3 Drawing Sheets

DISK DRIVE INCLUDING DC TO DC VOLTAGE CONVERTER FOR INCREASING VOLTAGE TO ITS SPINDLE MOTOR AND VCM

CROSS-REFERENCE TO RELATED PATENT APPLICATION

This patent application is a continuation-in-part of patent application Ser. No. 09/108,597 entitled "Faster Access Time in Disk Drive by Utilizing Increased VCM Potential Voltage" filed on Jul. 1, 1998, which is herein incorporated by reference.

BACKGROUND OF THE INVENTION

1. Field of the Invention

The present invention relates to hard disk drives. More particularly, the present invention relates to a disk drive including DC to DC voltage converter for increasing voltage to its spindle motor and VCM.

2. Description of the Prior Art

In hard disk drives, data is stored on magnetic media disks in concentric data tracks, which are divided into groups of data sectors. Servo information including track number, sector number, and tracking information is recorded in radially continuous narrow wedges between the groups of data sectors. The disk drive includes an actuator assembly having a voice coil motor (VCM), an actuator arm extending from the VCM, and a transducer head disposed at the end of the actuator arm. One way of improving disk drive performance is to reduce data access time, including the time required to move the transducer head of the actuator assembly from a current data track to a selected target data track.

The disk drive performs a seek operation to move the transducer head from a present data track to a target data track. The disk drive includes a servo system employed to seek to the target data track and thereafter follow the target data track on the disk. The servo system controls the VCM so that the VCM swings the actuator and its attached transducer head to access the target data track. Therefore, if the torque developed ($T_d$) by the VCM could be increased, a corresponding reduction in data access time could be achieved. $T_d$ is given by the following Equations I:

$$T_d = Kt \cdot I_{coil} \qquad \text{Equations I}$$

$$Kt = Ke (Kt \text{ in Nm/A; Ke in V/rad/sec})$$

$$Bemf = Ke \cdot Vel_{motor} (Vel_{motor} \text{ in rad/sec})$$

$$V_{applied} = V_{source} - Bemf = I_{coil} \cdot R_{coil}$$

$$I_{coil} = (V_{source} - Ke \cdot Vel_{motor}) / R_{coil}$$

Where:
$T_d$ is the torque developed by the VCM;
Kt is the Torque constant of the VCM;
$I_{coil}$ is VCM coil current;
Ke is the Voltage constant of the VCM i.e. the Bemf factor;
Bemf is the back emf of the VCM;
$Vel_{motor}$ is the velocity of the VCM;
$V_{applied}$ is the voltage applied to the VCM coil;
$V_{source}$ is the voltage of the VCM power source supplying power to the VCM; and
$R_{coil}$ is the total resistance of the VCM coil from the VCM power source to ground.

As can be shown by Equations I above, $T_d$ can be increased by increasing Kt and/or $I_{coil}$. Unfortunately, increasing $I_{coil}$ causes a corresponding heating of the VCM coil, proportional to the square of the current, which can result in heat related breakdown of VCM components, including the VCM coil itself. In particular, seek operations require the highest current to be supplied to the VCM in order to achieve competitive access times. Conversely, increasing Kt equates to an equal increase in Ke which increases the Bemf of the VCM. Therefore, the Bemf approaches $V_{source}$ as Kt is increased. Consequently, if $V_{source}$ cannot be increased, less voltage $V_{applied}$ is available and $I_{coil}$ is reduced as Kt is increased thereby limiting the performance of the VCM. The $V_{source}$ supplied to the VCM in disk drives, however, is fixed because, for compatibility with host systems, a standard power supply having a fixed voltage is used to supply power to the VCM. This fixed voltage power supply to the VCM therefore limits how much effect the VCM can have on reducing access times.

For reasons stated above and for other reasons presented in greater detail in the detailed description of the present specification, there is a desire to reduce data access time during seek operations in disk drives. In particular, there is a need to improve VCM performance by increasing the torque constant of the VCM to achieve a corresponding decrease in data access time in seek operations in disk drives. It would also be desirable to increase the torque constant of the VCM to permit a reduction in VCM coil current to reduce $I^2R$ power losses in the system while still maintaining a given torque in the VCM.

In disk drives, disks are typically stacked on a spindle assembly. The spindle assembly is mechanically coupled to a spindle motor which rotates the disks at a high spin-rate. A spindle motor driver typically includes power field effect transistors (FETs) to drive the spindle motor. A microprocessor is typically employed to ascertain when to apply a run signal, a coast signal, or a brake signal to the spindle motor driver to control the operation of the spindle motor.

The torque developed ($T_d$) by the spindle motor is given by the following Equations II:

$$T_d = Kt \cdot I_m \qquad \text{Equations II}$$

$$Kt = Ke (Kt \text{ in Nm/A; Ke in V/rad/sec})$$

$$Bemf = Ke \cdot \omega$$

$$V_{applied} = V_{source} - Bemf = I_m \cdot (R_m + R_{fet})$$

$$I_m = (V_{source} - Ke \cdot \omega) / (R_m + R_{fet})$$

Where:
$T_d$ is the torque developed by spindle motor;
Kt is the Torque constant of spindle motor;
$I_m$ is spindle motor current;
Ke is the Voltage constant of the spindle motor i.e. the Bemf factor;
Bemf is the back emf of the spindle motor;
$\omega$ is the rotational velocity of the spindle motor;
$V_{applied}$ is the voltage applied to the spindle motor;
$V_{source}$ is the voltage of the spindle motor source supplying power to the spindle motor;
$R_m$ is the total resistance of the spindle motor and wire connections between the spindle motor and the power FETs; and
$R_{fet}$ is the resistance in the power FETS that are turned on for controlling current $I_m$ flowing through the spindle motor.

Power dissipation in the windings of the spindle motor are given by the following Equation III:

$$P = I_m^2 \cdot R_m \qquad \text{Equation III}$$

Power dissipation in the power FETs are given by the following Equation IV:

$$P = I_m^2 \cdot R_{fet} \qquad \text{Equation IV}$$

It is known to increase the RPM of the spindle motor to reduce rotational latency and increase disk transfer rate in the disk drive. However, as disk drives employ spindle motors operating at higher RPMs, the increased drag at higher speeds causes an additional drag torque to be applied to the disk assembly. This drag torque increases at approximately the square of the spin-rate increase of the spindle motor. As can be shown by Equations II–IV above, the increased $T_d$ required to off-set the additional drag torque resulting from higher speed spindle motors, can be obtained by increasing Kt and/or $I_m$. Unfortunately, increasing $I_m$ causes a corresponding heating of the windings of the spindle motor as shown by the above power dissipation Equation III and also a corresponding heating of the power FETs used to drive the spindle motor as shown by the above Equation IV. The additional heat generated by the disk drive can cause heat related breakdown of components in the disk drive, including the spindle motor windings and the power FETs themselves. In addition, power supplies in high performance computer systems which employ disk drives having spindle motors operating at high RPMs, typically limit the peak and average current output from the computer system's power supply circuitry to reduce the cost of the computer system.

The $T_d$ can be increased by increasing Kt, but increasing Kt equates to an equal increase in Ke which increases the Bemf of the spindle motor. Therefore, the Bemf approaches $V_{source}$ as Kt is increased. Consequently, if $V_{source}$ cannot be increased, less voltage $V_{applied}$ is available and $I_m$ is reduced as Kt is increased thereby limiting the $T_d$ of the spindle motor. The $V_{source}$ supplied to the spindle motor in disk drives, however, is fixed because, for compatibility with host systems, a standard power supply having a fixed voltage is used to supply power to the spindle motor.

For reasons stated above and for other reasons presented in greater detail in the detailed description of the present specification, there is a desire to reduce the spindle motor current ($I_m$) disk drives, especially in high performance disk drives operating at 10,000 RPMs and higher. It would be desirable to increase the torque constant of the spindle motor to permit a reduction in $I_m$ to reduce $I^2R$ power losses in the disk drive while still maintaining a given torque in the spindle motor.

SUMMARY OF THE INVENTION

The present invention can be regarded as a disk drive and method of supplying increased voltage to a voice coil motor (VCM) and a spindle motor in a disk drive. The disk drive is connectable to a power supply having a fixed DC voltage. The disk drive includes a voice coil motor having a coil and a spindle motor having a plurality of windings. A power supply connector connects the power supply to a printed circuit board assembly. A DC to DC voltage converter is coupled to the power supply connector and converts the fixed DC voltage to an increased DC voltage greater than the fixed DC voltage. A voice coil motor driver has switching elements connected to the coil of the voice coil motor which are controllable to supply the increased DC voltage across the coil. A spindle motor driver has switching elements connected to the plurality of windings of the spindle motor which are controllable to supply the increased DC voltage across the plurality of windings.

The increased VCM voltage permits the torque constant of the VCM to be increased to allow greater torque to be developed by the VCM resulting in reduced data access times during seek operations in the disk drive. The increased VCM voltage advantageously permits the torque constant of the VCM to be increased while allowing for a corresponding reduction in VCM coil current to reduce $I^2R$ power losses in the disk drive while still maintaining a given torque in the VCM. The increased spindle motor voltage advantageously permits the torque constant of the spindle motor to be increased while allowing for a corresponding reduction in current through the windings of the spindle motor to reduce $I^2R$ power losses in the disk drive while still maintaining a given torque in the spindle motor.

DESCRIPTION OF THE PREFERRED EMBODIMENTS

Figure 1:
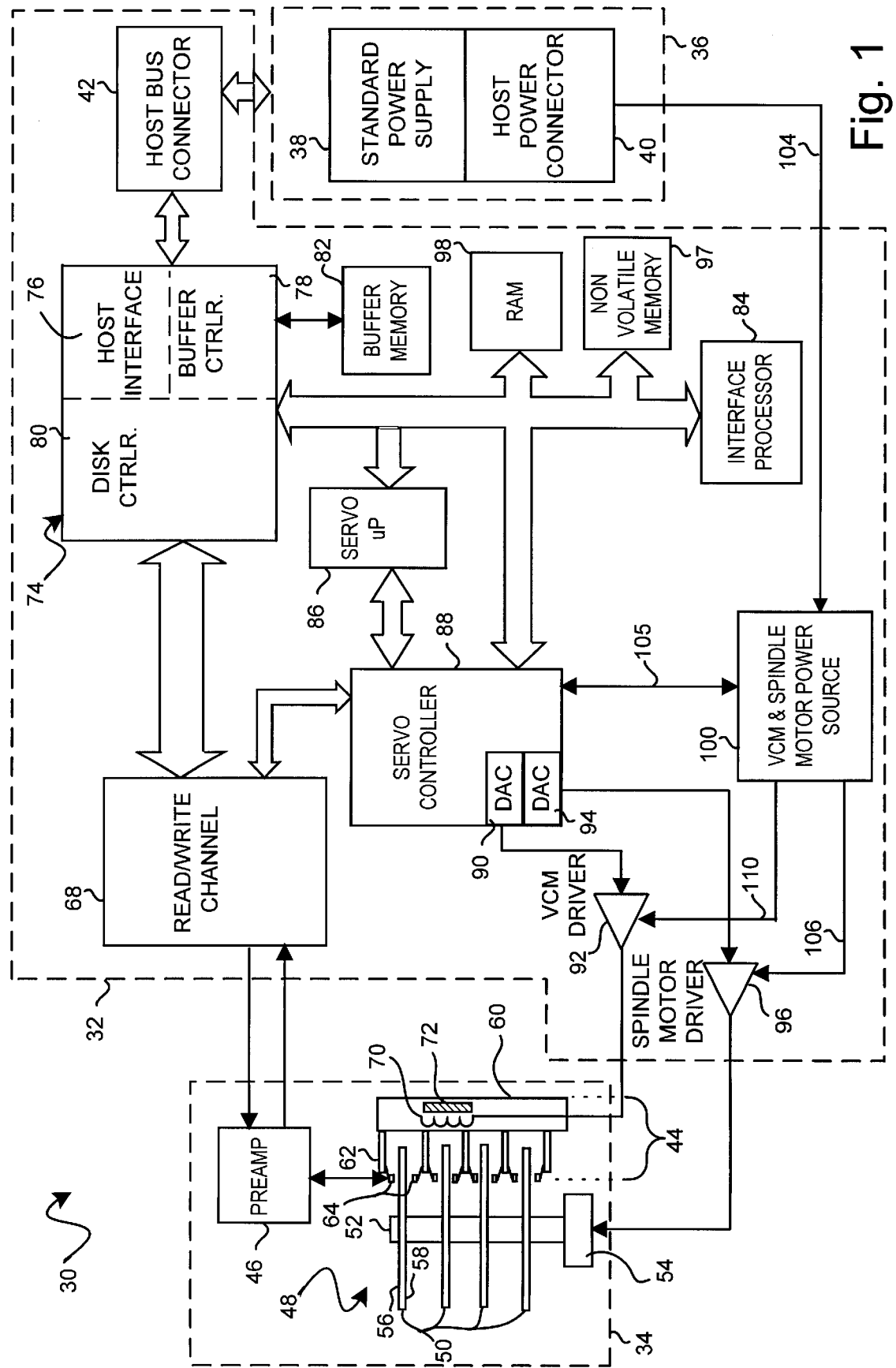
FIG. 1 is a block diagram of a hard disk drive embodying the invention and a corresponding host system power supply.

A hard disk drive according to the present invention is illustrated generally at 30 in FIG. 1. Disk drive 30 includes a disk controller circuit board 32 and a head disk assembly (HDA) 34. Disk controller circuit board 32 includes circuitry and processors which provide an intelligent disk control system interface between a host system 36 and HDA 34 for execution of read and write commands. Host system 36 can include a microprocessor based data processing system such as a personal computer, or other system capable of performing a sequence of logical operations. Host system 36 includes a standard power supply 38 which supplies power to disk controller circuit board 32 via a power supply connector 40. Data is transmitted between host system 36 and disk controller circuit board 32 via a host bus connector 42.

HDA 34 includes an actuator assembly 44, a preamplifier 46, and a disk assembly 48. Disk assembly 48 includes a plurality of magnetic media disks, such as indicated at 50. Disks 50 are stacked on a spindle assembly 52. Spindle assembly 52 is mechanically coupled to a spindle motor 54 for rotating disks 50 at a high rate of speed. Each disk 50 includes two disk surfaces capable of storing data thereon, such as indicated at 56 and 58. Actuator assembly 44 includes a voice coil motor (VCM) 60 and actuator arms 62 extending from VCM 60. Each actuator arm 62 corresponds to a respective disk surface such as 56 or 58. A transducer head 64 is disposed at the end of each actuator arm 62, and each transducer head 64 is associated with a disk surface 56 or 58. Transducer heads 64 communicate with disk controller circuit board 32 via preamplifier 46 for reading and writing data to the transducer head's associated disk surface. Preamplifier 46 is electrically coupled to transducer head 64 for receipt and amplification of position signals representative of the position of transducer head 64. Preamplifier 46 provides an amplified signal to a read/write channel 68 of disk controller circuit board 32. Read/write channel 68 performs encoding and decoding of data written to and read from disks 50.

VCM 60 includes a coil 70 moving in proximity to a permanent magnet 72. Actuator arms 62 are permanently coupled to VCM 60. VCM 60 swings actuator arms 62 and their corresponding transducer heads 64 back and forth over their associated disk surfaces 56 or 58 to access target data tracks formed on the associated disk surface.

Disk control circuit board 32 includes a host interface and disk controller (HIDC) integrated circuit 74. HIDC 74 includes a host interface 76, a buffer controller 78, and a disk controller 80. Host interface 76 communicates with host system 36 via host bus connector 42 by receiving commands and data from and transmitting status and data back to host system 36. Buffer controller 78 controls a buffer memory 82 employed for storing data from host system 36 which is to be written to disks 50. In addition, buffer controller 78 controls buffer memory 82 for storing read data from disks 50 to be transmitted to host system 36 via host interface 76. Buffer memory 82 typically comprises random access memory (RAM), such as dynamic random access memory (DRAM).

Disk controller 80 sends data to and receives data from read/write channel 68. Disk controller 80 also provides for error correction and error detection on data transmitted to or read from disk 50.

An interface processor 84 handles the flow of data and commands received by host interface 76 by sending commands to and reading status from disk controller 80. Interface processor 84 ascertains which commands to process from host system 36 and when to process these commands, and directs other tasks performed by disk controller 80.

A servo processor 86 commands a servo controller 88 to control the position of transducer head 64 over disk 50 at a target data track for subsequent execution of read or write commands. Servo processor 86 receives a representative form of the position signals sensed by transducer head 64 and amplified by preamplifier 46 via read/write channel 68 and servo controller 88 and performs calculations to position transducer head 64 relative to its associated disk surface. Servo processor 86 commands a digital to analog converter (DAC) 90 in servo controller 88 to provide a corresponding analog signal to a VCM driver 92. VCM driver 92 responds to the analog signal from DAC 90 to provide a corresponding current to VCM 60. More specifically, the current from VCM driver 92 is provided to coil 70 of VCM 60 and causes movement of coil 70 which in turn causes attached actuator arm 62 to swing and thereby move transducer head 64 over an associated disk surface 56 or 58 to access target data tracks.

Servo processor 86 also provides commands to servo controller 88 to control the rotational velocity of spindle motor 54. A DAC 94 in servo controller 88 provides an analog signal to a spindle motor driver 96. Spindle motor driver 96 responds to the analog signal from DAC 94 to drive and thereby control the speed of spindle motor 54. Spindle motor driver 96 also detects a back EMF of spindle motor 54 and provides a signal representative of the spin-rate of spindle motor 54 to servo controller 88 which converts the signal into a monitored velocity signal which can be read by servo processor 86. In this way, servo processor 86 can control the spin-rate of spindle motor 54 via servo controller 88 to maintain a substantially constant spin-rate of rotating disks 50.

Disk system operational programs are stored in non-volatile memory 97, such as read-only memory (ROM) or flash memory, and can be all or partially loaded into RAM 98 for execution from RAM 98 or both RAM 98 and non-volatile memory 97. Alternatively, portions of disk system operational programs are stored on reserve cylinders on disk 50. Suitably, servo processor 86 may have integrated or separate memory (not shown) for storage of servo programs.

The current track position of transducer head 64 is stored by servo processor 86 to determine a required seek distance between the current data track and a target data track. Based on the required seek distance, servo processor 86 retrieves a corresponding read or write seek profile and provides a digital signal command to DAC 90 corresponding to the seek profile. The profile determines the performance of a seek operation and is highly dependent on the VCM dynamics, i.e. torque constant $K_t$ and applied current $I_{coil}$ discussed above. DAC 90 provides a corresponding analog signal to VCM driver 92 representative of the seek profiles. VCM driver 92 provides a current output to coil 70 of VCM 60 for acceleration and/or deceleration of actuator arm 62 to perform a seek operation to move transducer head 64 from the current data track to the target data track. As actuator arm 62 moves from the current data track to the target data track, position information is received through the sensing of servo wedges disposed on disk surface 56 or 58. Based on this position information, a position error signal is provided via preamplifier 46, read/write channel 68, and servo controller 88 to servo processor 86 to provide a representative position of transducer head 64 relative to its associated disk surface 56 or 58. Upon completion of a seek operation and the corresponding alignment of transducer head 64 over the target data track, a read or write command is executed to read data from or write data to the target data track.

VCM and Spindle Motor Boosted Voltage Power Source

According to the present invention, hard disk drive 30 includes a VCM and spindle motor power source circuit 100. VCM and spindle motor power source circuit 100 receives a regulated 12 volt power source 104 from standard power supply 38 of host system 36 via power supply connector 40. VCM and spindle motor power source circuit 100 supplies boosted voltage power on a power line 110 to VCM driver 92 which drives VCM 60. VCM and spindle motor power source circuit 100 supplies boosted voltage power on a power line 106 to spindle motor driver 96 which drives spindle motor 54. VCM and spindle motor power source circuit 100 supplies power independently of VCM 60 and spindle motor 54. In other words, the back EMF generated in VCM 60 and the back EMF generated in spindle motor 54 are not employed by VCM and spindle motor power source circuit 100.

VCM and spindle motor power source circuit 100 provides an increased voltage to VCM 60 via VCM driver 92 during seek operations. [In one embodiment, VCM and spindle motor power source circuit 100 is controlled by servo controller 88 via a line 105 to provide the boosted voltage power source as the VCM power source on line 110 only during seek operations.] This increased voltage to VCM 60 significantly reduces access time during seek operations in disk drive 30 as compared to a conventional disk drive without VCM and spindle motor power source circuit 100.

In one embodiment, VCM and spindle motor power source circuit 100 provides an increased voltage to spindle motor 50 via spindle motor driver 96 during start-up and run operations. The increased voltage to spindle motor 54 during start-up and run operations permits a higher torque constant ($K_t$) to be employed in spindle motor 54 to thereby permit a reduction in the spindle motor current to reduce $I^2R$ power losses in disk drive 30 while still maintaining a given torque in spindle motor 54.

Figure 2:
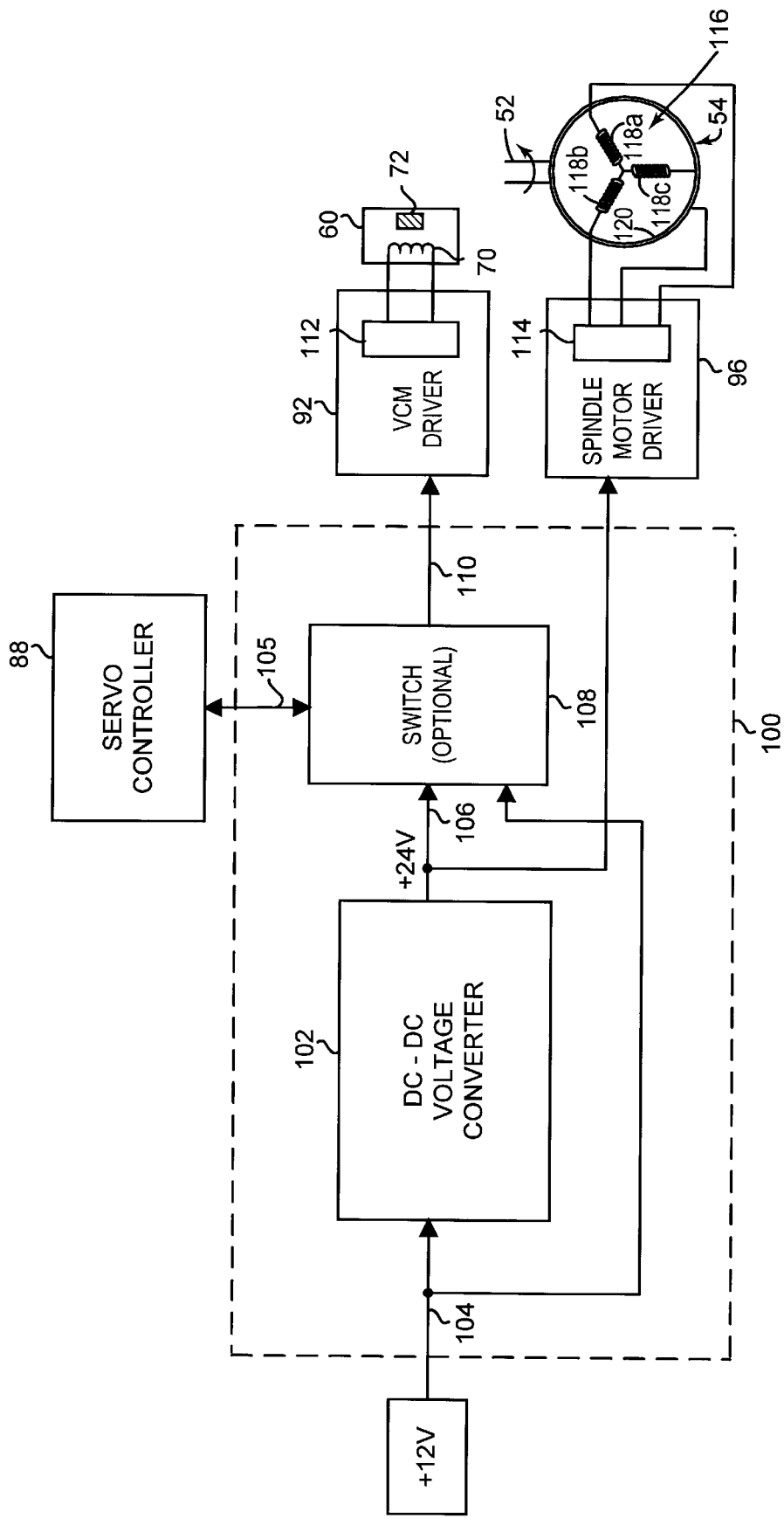
FIG. 2 is a block and schematic diagram of a portion of the hard disk drive of FIG. 1 illustrating a DC to DC voltage converter employed in a VCM and spindle motor power source circuit of the hard disk drive.

FIG. 2 illustrates a portion of disk drive 30 to illustrate one embodiment of VCM and spindle motor power source circuit 100 according to the present invention which includes a continuous regulated voltage supply circuit, such as a DC to DC boost converter or voltage converter 102. DC to DC voltage converter 102 receives a standard power source on input power line 104 and provides a regulated boosted voltage power source on a power line 106. In one exemplary embodiment, DC to DC voltage converter 102 receives a standard power source of approximately 12 volts on line 104 and provides a boosted 24 volts on line 106. DC to DC voltage converter 102 needs to produce a sufficient amount of current to perform seek operations at the boosted voltage. If the VCM characteristics were held constant, doubling the VCM voltage from 12 volts to 24 volts would allow twice the current to be applied to the VCM for performing seek operations than that of the normal standard 12 volt power source. However as noted above, the higher voltage enables the VCM torque constant to be modified, thereby reducing system power losses. In this example embodiment, the doubling of the power source to VCM driver 92 provides on average approximately a 15 to 20 percent reduction in seek times, with an even more significant reduction during short seeks.

Suitably, DC to DC voltage converter 102 provides load current requirements of approximately 2A continuous and 4A transient. Suitably, DC to DC voltage converter 102 is implemented as a switching boost regulator and produces an output voltage ripple of less than 100 mV peak to peak.

Increasing Voltage to VCM

In the embodiment of VCM and spindle motor power source circuit 100 illustrated in FIG. 2, an optional switch 108 receives the boosted voltage power source on line 106 and the standard power source on line 104 and provides the VCM power source on power line 110 to VCM driver 92. Suitably, switch 108 comprises field effect transistors (FETs) for properly switching the desired power source onto power line 110. In one embodiment, switch 108 is controlled by servo controller 88 via line 105 to provide the boosted voltage power source on line 106 as the VCM power source on line 1 10 only during seek operations. VCM driver 92 includes switching elements 112, such as power FETs, which are coupled across VCM coil 70 of VCM 60. Switching elements 112 are controllable to supply the increased DC voltage of the VCM power source on power line 110 across VCM coil 70.

The access time in disk drive 30 is reduced because the boosted voltage from DC to DC voltage converter 102 permits a higher torque constant to be used in VCM 60 than can be used by a VCM receiving a standard 12 volt power supply. The increased torque constant of VCM 60 allows greater torque to be developed by VCM 60, which reduces access time by reducing seek time.

In addition, the increased torque constant in VCM 60 permitted as a result of the boosted voltage from DC to DC voltage converter 102 can alleviate heat related breakdown of components of VCM 60 by not requiring as much current to pass through coil 70 to achieve an equivalent amount of torque in VCM 60. Additionally, a significant improvement in coil current rise time is obtained with boosted voltages to VCM 60. Moreover, switching time between the acceleration phase and the deceleration phase of the seek operation is also reduced by utilizing the boosted VCM voltages.

Figure 3:
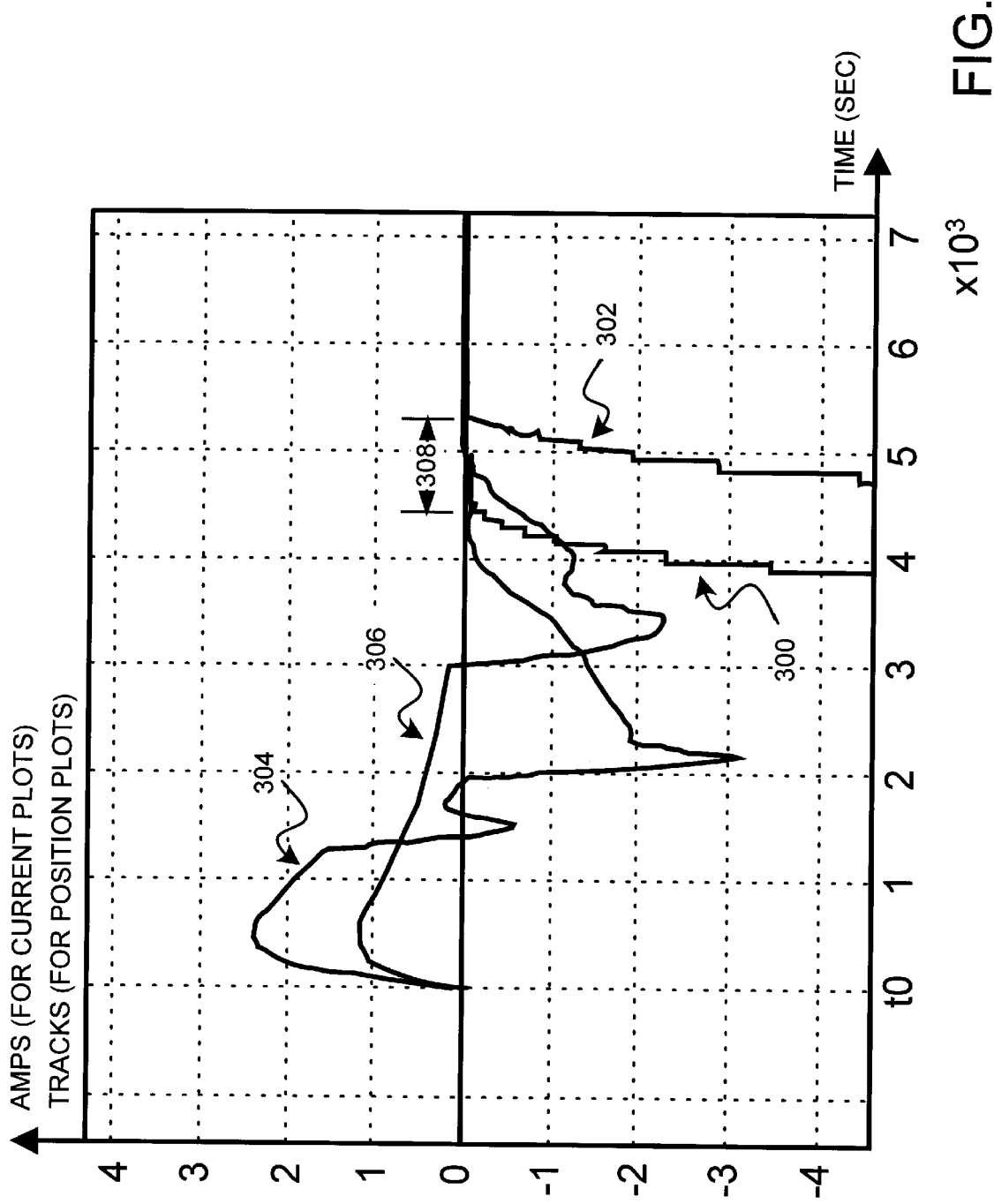
FIG. 3 is a graphical diagram illustrating track position and VCM coil current versus time for a 12 volt standard power supply and a 24 volt VCM power source according to the present invention.

Simulation results for a VCM using a 12 volt standard power supply and for using a 24 volt VCM power source according to the present invention from a somewhat idealized model of a seek operation in a disk drive are illustrated graphically in FIG. 3. FIG. 3 plots track position and VCM coil current versus time with a constant Kt for both cases of the motor. For reasons discussed above, a practical implementation would use a motor having increased Kt to provide improved torque without suffering heating effects from higher current. In the seek operation modeled in FIG. 3, a transducer head moves from a current data track to a target data track during a seek traversing approximately one-third of the actuator stroke.

A curve 300 plots track position directly preceding arrival at the target track for a VCM receiving the 24 volt VCM power source during the deceleration phase of the model seek operation. Comparably, a curve 302 plots track position preceding arrival at the target track for a VCM receiving the 12 volt standard power supply during the deceleration phase of the model seek operation. A curve 304 plots VCM coil current for the VCM receiving the 24 volt VCM power source during the model seek operation including acceleration and deceleration phases. A curve 306 comparably plots VCM coil current for the VCM receiving the 12 volt standard power supply during the model seek operation.

As illustrated in FIG. 3, the coil current rise time is significantly reduced by using the 24 volt VCM power source according to the present invention during the model seek operation instead of the 12 volt standard power supply. Also, as indicated by interval 308, there is an approximate 20 percent reduction in the total model seek time with the 24 volt VCM power source according to the present invention.

Increasing Voltage to Spindle Motor

In the embodiment of VCM and spindle motor power source circuit 100 illustrated in FIG. 2, the boosted voltage power source on line 106 is provided directly to spindle motor driver 96. Spindle motor driver 96 includes switching elements 114, such as power FETs, for switching the increased voltage on power line 106 to spindle motor 54.

The embodiment of spindle motor 54 illustrated in FIG. 2 includes a stator 116 having three windings 118a, 118b, and 118c electrically arranged in a Y-configuration, and a rotor 120. Rotor 120 has magnets that provide a permanent magnetic field. Spindle motor 54 generates torque ($T_d$) on rotor 120 when current ($I_m$) flows through at least one of windings 118. $T_d$ depends upon the magnitude and direction of current flow through windings 118, and the angular position of rotor 120 relative to stator 116. The functional relationship between torque and current flow and angular position is commonly depicted in a set of torque curves, each of which correspond to a respective one of a set of commutation states. Various firmware routines are stored in memory locations in non-volatile memory 97 for controlling the operation of spindle motor 54. Servo microprocessor 86 preferably comprises a digital signal processor that runs routines from non-volatile memory 97 to control spindle motor 54.

As illustrated in FIG. 2, switching elements 114 of power driver 96 are coupled to windings 118 of spindle motor 54. Switching elements 114 are controllable to supply the increased DC voltage from DC to DC voltage converter 102 on power line 106 across windings 118. The spindle motor current ($I_m$) through windings 118 can be reduced because the boosted voltage from DC to DC voltage converter 102 permits a higher torque constant (Kt) to be used in spindle motor 54 than can be used by a spindle motor receiving a standard 12 volt power supply. Therefore, the increased Kt in spindle motor 54 permitted as a result of the boosted voltage from DC to DC voltage converter 102 can alleviate heat related breakdown of components of disk drive 30 including windings 118 and switching elements 114 (e.g., power FETs) by not requiring as much current to pass through windings 118 to achieve an equivalent amount of torque ($T_d$) in spindle motor 54.

When the torque constant (Kt) of spindle motor 54 is increased, there is a typically a corresponding increase in the total resistance ($R_t$) of the spindle motor and wire connections between the spindle motor and the power FETs and the power FETs that are turned on for controlling current $I_m$ flowing through the spindle motor. In one example, Kt is doubled as a result of increasing the source voltage to the spindle motor 54 from 12 volts to 24 volts. In this example, it is assumed that $R_t$ also doubles. Assuming the torque ($T_d$) of spindle motor 54 is constant, the run or start current $I_m$ flowing through spindle motor 54 is reduced by one half as a result of doubling Kt. In this example, the delta reduction in power consumed in disk drive 30 as a result of being able to double Kt of spindle motor 54 is equal to [Spindle Motor Related Power Losses Before Doubling Kt] minus [Spindle Motor Related Power Losses After Doubling Kt].

This is expressed in the following Equation V:

$$Delta\ P_{reduced} = [I_m^2 * R_t] - [(I_m/2)^2 * 2R_t] \quad \text{Equation V}$$
$$= I_m^2 * R_t / 2$$

Where:

Delta Preduced is the delta reduction in power as a result of being able to double Kt of the spindle motor;

$I_m$ is the spindle motor current; and $R_t$ is the total resistance of the spindle motor and wire connections between the spindle motor and the power FETs and the power FETs that are turned on for controlling current $I_m$ flowing through the spindle motor.

This reduction in spindle motor related power losses in a hard drive according to the present invention permits the disk drive to employ larger diameter disks that produce larger drag torque requiring an increased torque ($T_d$) to offset the larger drag torque at higher spindle motor spinrates, such as 10,000 RPM. The larger diameter disks do not result in excessive spindle motor related power losses because the required additional spindle motor $T_d$ is obtained by increasing Kt of the spindle motor instead of increasing $I_m$ through the spindle motor.

We claim:

1. A disk drive connectable to a power supply having a fixed DC voltage, the disk drive comprising:

a disk comprising a plurality of concentric tracks;

a head;

a voice coil motor having a coil, the voice coil motor for actuating the head radially over the disk during a tracking mode in order to maintain the head along a circumferential path defined by a selected track and during a seek mode in order to move the head from a first track to a second track;

a DC to DC voltage converter for converting the fixed DC voltage to an increased DC voltage greater than the fixed DC voltage;

a switch comprising a first input connected to the fixed DC voltage and a second input connected to the increased DC voltage, the switch for selecting between the fixed DC voltage and the increased DC voltage to output a selected DC voltage;

a voice coil motor driver having switching elements connected to the coil of the voice coil motor which are controllable to supply the selected DC voltage across the coil; and a servo controller for controlling the switch to output the fixed DC voltage during the tracking mode and to output the increased DC voltage during the seek mode.

2. A method of controlling a voltage applied to a coil of a voice coil motor in a disk drive connectable to a power supply having a fixed DC voltage, the disk drive comprising a head and a disk comprising a plurality of concentric tracks, the voice coil motor for actuating the head radially over the disk during a tracking mode in order to maintain the head along a circumferential path defined by a selected track and during a seek mode in order to move the head from a first track to a second track, the method comprising the steps of:

converting the fixed DC voltage to an increased DC voltage greater than the fixed DC voltage;

applying the fixed DC voltage across the coil of the voice coil motor during the tracking mode; and applying the increased DC voltage across the coil of the voice coil motor during the seek mode.

\* \* \* \* \*